(12) United States Patent
Andarawis et al.

(10) Patent No.: US 7,180,305 B2
(45) Date of Patent: Feb. 20, 2007

(54) SENSOR SYSTEMS AND METHODS OF OPERATION

(75) Inventors: Emad Andarawis Andarawis, Ballston Lake, NY (US); James Anthony Ruud, Delmar, NY (US); Samhita Dasgupta, Niskayuna, NY (US); Mahadevan Balasubramaniam, Clifton Park, NY (US); Charles Rickards, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 10 days.

(21) Appl. No.: 11/012,508

(22) Filed: Dec. 14, 2004

(65) Prior Publication Data

US 2006/0125492 A1 Jun. 15, 2006

(51) Int. Cl.
*G01R 27/26* (2006.01)
(52) U.S. Cl. ..................................... 324/667; 324/662
(58) Field of Classification Search ................ 324/667, 324/664, 663, 658, 649, 600, 635, 644, 661, 324/662, 671, 686, 699
See application file for complete search history.

(56) References Cited

U.S. PATENT DOCUMENTS

| | | | | |
|---|---|---|---|---|
| 3,898,472 A | * | 8/1975 | Long | 180/270 |
| 5,166,626 A | | 11/1992 | Hester et al. | 324/690 |
| 5,353,798 A | * | 10/1994 | Sieben | 600/462 |
| 5,564,434 A | * | 10/1996 | Halperin et al. | 600/488 |
| 5,748,005 A | * | 5/1998 | McCormick et al. | 324/662 |
| 5,933,550 A | * | 8/1999 | Fujieda et al. | 382/314 |
| 6,163,723 A | * | 12/2000 | Roberts et al. | 607/18 |
| 6,239,601 B1 | * | 5/2001 | Weinstein | 324/662 |
| 6,420,882 B1 | * | 7/2002 | Engebretsen et al. | 324/667 |
| 6,668,614 B2 | * | 12/2003 | Itakura | 73/1.38 |
| 6,717,418 B2 | | 4/2004 | Orenstein | 324/644 |
| 6,788,112 B1 | * | 9/2004 | Chan et al. | 327/51 |
| 6,944,359 B2 | * | 9/2005 | Kamei et al. | 385/12 |
| 2003/0094956 A1 | * | 5/2003 | Orenstein | 324/644 |

\* cited by examiner

*Primary Examiner*—Andrew H. Hirshfeld
*Assistant Examiner*—Hoai-An D. Nguyen
(74) *Attorney, Agent, or Firm*—Fletcher Yoder

(57) ABSTRACT

A technique for operating a sensor system is provided. The method includes exciting a first sensor with a first excitation signal at a first frequency and exciting a second sensor with a second excitation signal at a second frequency. The technique also includes combining a first measurement signal generated from the first sensor with a second measurement signal generated from the second sensor to determine a sensed parameter. The technique may be employed for reducing crosstalk between closely proximate sensors, such as capacitive probes, and may serve to determine distances within operating machines, such as turbine systems.

18 Claims, 4 Drawing Sheets

SENSOR SYSTEMS AND METHODS OF OPERATION

BACKGROUND

The invention relates generally to sensor systems and, more particularly, to sensor systems that are configured to reduce crosstalk between sensors in close proximity to provide an accurate measurement of distance between two objects.

Various types of sensors have been used to measure the distance between objects. In addition, such sensors have been used in various applications. For example, in turbine systems, the clearance between a static shroud and turbine blades is greatest when the turbine is cold, and gradually decreases as the turbine heats up and as it spins up to speed. It is desirable that a gap or clearance between the turbine blades and the shroud be maintained for safe and effective operation of the turbine. A sensor may be disposed within the turbine to measure the distance between the turbine blades and the shroud. The distance may be used to direct movement of the shroud to maintain the desired displacement between the shroud and the turbine blades.

Typically, two or more sensors are employed in close proximity for accurate measurement of clearance between two objects. In certain applications, capacitance probes are employed to measure the distance between two objects. The clearance measurements by these probes are affected by certain parameters such as temperature, size of the target object, crosstalk between the sensors and so forth. For accurate clearance measurements from sensors, it is desirable to reduce the crosstalk between the sensors that are positioned in a close proximity. In conventional sensor systems, a shielding mechanism is provided to reduce the crosstalk between the sensors. However, such shielding mechanisms limit the sensor dimensions and require significant design effort to achieve an optimum size of the sensor with a required shielding mechanism.

Moreover, in certain applications such as gas turbines, such sensor systems are typically employed to measure clearances between parts while offline testing. In such applications, it is not desirable to employ sensor systems for accurate measurements of clearance in parts during in service due to the effect of crosstalk between sensors in close proximity. Further, as the separation between the sensors decreases, the effect of crosstalk between the sensors may require design modifications and frequent calibration of the sensor systems to reduce the effect of crosstalk in the sensors and provide an accurate measurement.

Accordingly, there is a need to provide a sensor system that would reduce the crosstalk between sensors located in close proximity and provide an accurate measurement of the clearance between two objects. It would be also advantageous to provide a self-calibrating sensor system that could be employed for accurate clearance measurement for parts in operation for a long period of time without a need of periodic calibration.

BRIEF DESCRIPTION

Briefly, according to one embodiment a method of operating a sensor system is provided. The method includes exciting a first sensor with a first excitation signal at a first frequency, and exciting a second sensor with a second excitation signal at a second frequency. The second frequency is different than the first frequency. The method also includes combining a first measurement signal from the first sensor with a second measurement signal from the second sensor to determine a sensed parameter.

In another embodiment, a sensor system is provided. The sensor system includes at least two sensors, each sensor being configured to receive a respective one of a plurality of excitation signals. Each of the excitation signals has a respective frequency, with frequencies of the excitation signals being different from one another. Each of the sensors is further configured to provide a reflected signal. A combiner is configured to combine a plurality of measurement signals from respective ones of the sensors to determine a sensed parameter

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
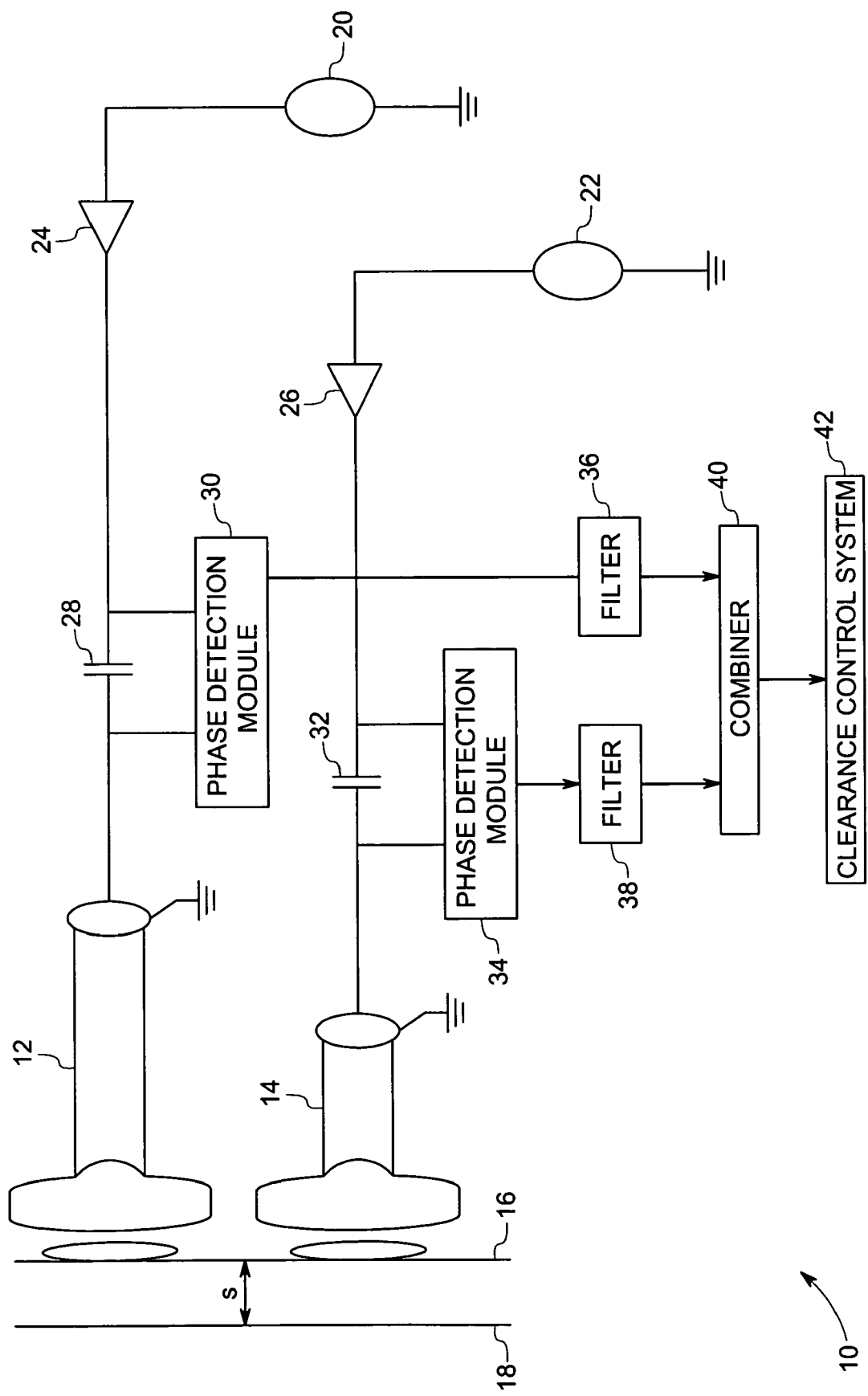
FIG. 1 is a diagrammatical representation of a sensor system, in accordance with an exemplary embodiment of the present technique.

FIG. 1 illustrates a sensor system 10 for measuring a clearance between two objects, such as, the clearance between a turbine blade and a shroud in a turbine of an aircraft engine. In the illustrated embodiment, the sensor system 10 includes a first sensor 12 and a second sensor 14 disposed on one of a first object 16 or a second object 18. In the illustrated embodiment, the first and second sensors 12 and 14 are both disposed on the first object 16. However, the first and second sensors 12 and 14 may be disposed on the second object 18. It should be appreciated by one skilled in the art that depending upon an application and a physical configuration the term "disposed on" as described here may include secured to, mounted on, attaching with or otherwise associated with the first or second objects 16 and 18. In this embodiment, the first and second sensors 12 and 14 are capacitive probes that are disposed in a close proximity to provide accurate capacitive measurements. It should be noted that, as used herein, the term "close proximity" refers to a separation between the first and second sensors 12 and 14 that is substantially equal to the size of the sensor tips for the first and second sensors 12 and 14.

In one embodiment, the first and second objects comprise a moving object and a static object respectively. In this embodiment, the first sensor 12 and the second sensor 14 are disposed on the static object and are configured to measure the clearance between the static object and the moving object at different points in time.

The sensor system 10 of FIG. 1 includes a first signal generator 20 configured to excite the first sensor 12 at a first excitation frequency. In addition, the sensor system 10 includes a second signal generator 22 configured to excite the second sensor 14 at a second excitation frequency different from the first frequency. Further, amplifiers 24 and 26 may be coupled to the first and second signal generators 20 and 22 respectively to amplify input signals generated from the first and second signal generators 20 and 22. A capacitor 28 and a phase detection module 30 may be coupled to the first sensor 12 for measuring the capacitance through the first sensor 12. Similarly, a capacitor 32 and a phase detection module 34 may be coupled to the second sensor 14 for measuring a capacitance through the second sensor 14.

In operation, the first and second sensors 12 and 14 are excited by the first and second signal generators 20 and 22, respectively. In this embodiment, the first and second excitation frequencies of the signals generated from the first and second signal generators 20 and 22 are harmonically unrelated. For example, if the first sensor 12 is excited at a first excitation frequency, the second sensor 14 would be excited at a second excitation frequency that is not a whole number multiple of the first excitation frequency. The first excitation frequency results in a first measurement signal from the first sensor 12. Similarly the second excitation frequency results in a second measurement signal from the second sensor 14. The first and second measurement signals are representative of first and second sensed parameters respectively. In this embodiment, the first and second sensed parameters are capacitances measured across the capacitors 28 and 32, respectively.

The capacitance between two objects is a function of the overlap surface area (A) and the separation (S) between the two objects. The capacitance between two parallel plates is given by the following equation:

$$C = \epsilon A/S \quad (1)$$

where C is the capacitance;
ϵ is the permittivity of a medium between the parallel plates;
A is the overlap area between the parallel plates; and
S is separation of the parallel plates.

By sensing the capacitance (C), the sensors 12 and 14 enable the separation (S) between the probes 12 and 14 and the object 18 to be established. By manipulating equation (1) above, the following equation relates the separation (S) to the capacitance (C).

$$S = \epsilon A/C \quad (2)$$

The first measurement signal from the first sensor 12 may include a noise component from the second sensor 14 due to crosstalk between the first and second sensors 12 and 14. Similarly, the second measurement signal from the second sensor 14 may also include a noise component from the first sensor 12. The noise components in the first and second measurement signals may be separated through a synchronous measurement scheme, as will be described in detail below.

In a present embodiment, the phase detection module 30 is configured to detect a first reflected signal by using a synchronous measurement scheme based upon the first excitation frequency to generate the first measurement signal. In one embodiment, the synchronous measurement scheme includes performing multiple phase measurements to determine a phase between each of the reflected signals and the respective excitation signals. Further, each of the phases may be filtered through a filter 36 to filter any signal noise generated by the crosstalk between the first sensor 12 and the second sensor 14. In one embodiment, the filtering is performed by averaging the measured phases. However, other techniques may be employed for the filtering of the first measured signal. Similarly, the phase detection module 34 is configured to detect a second reflected signal by using the synchronous measurement scheme based upon the second excitation frequency. Again, multiple phase measurements may be performed through the phase detection module 34 and the phases may be filtered through a second filter 38. In one embodiment, a single phase detection module and a single filter are employed for generating the first and second measurement signals. In one embodiment, the sensor system 10 includes at least two coaxial cables that are configured to convey a respective one of excitation signals to the respective one of sensors 12 and 14. In another embodiment, the sensor system 10 may include at least two waveguides that are configured to convey a respective one of excitation signals to the respective one of sensors 12 and 14.

The first and second measurement signals from the first and second sensors 12 and 14 are combined through a combiner 40 to determine a ratiometric capacitance between the first and second objects 16 and 18. In one embodiment, the first and second measurement signals are compared through a comparator to determine the ratiometric capacitance between the first and second objects. It should be noted that the ratiometric capacitance provides a substantially accurate crosstalk-minimized capacitance measurement between the first and second objects 16 and 18. Further, such capacitance is used to determine the separation between the first and second objects 16 and 18 that may be used to control the clearance between the first and second objects 16 and 18 via a clearance control system 42. As described above, the sensor system 10 employs two sensors 12 and 14 for capacitive measurements between the objects 16 and 18. However, other configurations of the sensor system 10 having more sensors may be envisaged.

Figure 2:
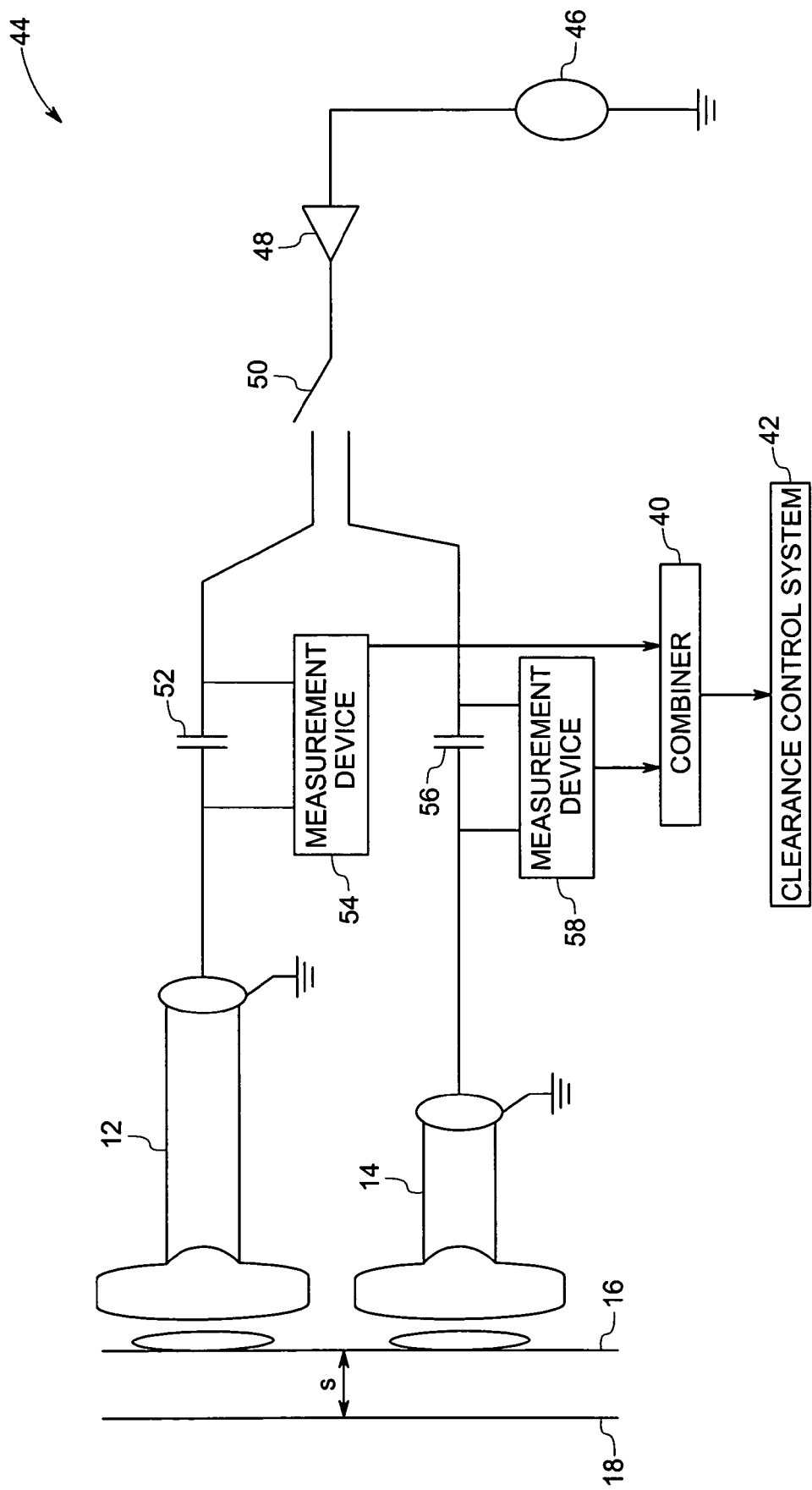
FIG. 2 is a diagrammatical representation of a sensor system in accordance with another exemplary embodiment of the present technique.

FIG. 2 illustrates another exemplary sensor system 44 according to another embodiment, for measuring a clearance between the first and second objects 16 and 18. In this embodiment, the sensor system 44 employs a switched excitation technique for measuring the capacitance between the first and second objects 16 and 18 that is representative of the separation between the two objects 16 and 18. In the illustrated embodiment, the first and second sensors 12 and 14 are disposed on one of the first or second objects 16 and 18. In this embodiment, the first and second sensors 12 and 14 are disposed on the first object 16. In the illustrated embodiment, the first and second sensors 12 and 14 are capacitive probes that are excited by a signal generator 46 at different points in time through switching the excitation signals between the first and second sensors 12 and 14 at a pre-determined switching interval. In this embodiment, the switching may be performed for every sample or every measurement period at a speed of at least one megahertz. In other applications sampling frequency and sampling scheme may vary. An amplifier 48 may be coupled to the signal generator 46 to boost the excitation signals for the first and second sensors 12 and 14.

In a presently contemplated configuration, a switch 50 is employed to perform the switching of excitation signals between the first and second sensors 12 and 14. Examples of the switch 50 include a radio frequency micro electromechanical system (RF MEMS) switch, a solid-state switch and so forth. In one embodiment, the switch 50 is in a first position that enables the signal generator 46 to provide a first excitation signal to the first sensor 12. In another embodiment, the switch 50 is in a second position that enables the signal generator 46 to provide a second excitation signal to the second sensor 14. The sensor system 44 includes a capacitor 52 and a measurement device 54 coupled to the first sensor 12 to measure capacitance through the first sensor 12. Similarly, a capacitor 56 and a measurement device 58 may be coupled to the second sensor 14 to measure the capacitance between the first and second objects 16 and 18 through the second sensor 14.

In operation, the first sensor 12 is excited with a first excitation signal. In this embodiment, the second sensor 14 is held at a pre-determined voltage to minimize the interference and noise due to the second sensor 14. Further, the second sensor 14 may act as a return path and as a shield for sensor 12 to shield the sensor 12 from noise and interference. In one embodiment, the second sensor 14 is held at ground while exciting the first sensor 12. The excitation of the first sensor 12 generates a first measurement signal that is measured by the measurement device 54. In one embodiment, the measurement device 54 may include a phase detection module that is configured to measure a phase between a reflected signal and a respective excitation signal for the first sensor 12. However, other measurement devices may be employed to measure the capacitance from the first sensor 12 to generate the first measurement signal.

Following the detection of the first measurement signal, the second sensor 14 is excited with a second excitation signal through switching the excitation signal from the first sensor 12 to the second sensor 14 via the switch 50. In one embodiment, the second excitation signal has a similar frequency as that of the first excitation signal. Again, a second measurement signal is generated from the second sensor through the measurement device 58 as described above. Further, the first sensor 12 may be held at a pre-determined voltage or at ground during excitation of the second sensor 14. The first and second measurement signals from the first and second sensors 12 and 14 are then combined through the combiner 40 to determine the capacitance between the first and second objects 16 and 18. The measured capacitance may be used to estimate the clearance between the first and second objects 16 and 18 that may be used to control the clearance between the first and second objects 16 and 18 via the clearance control system 42. In the illustrated embodiment, the sensor system 44 includes a single signal generator 46 and a single switch 50 for switching the excitations signals between the first and second sensors 12 and 14. However, other configurations of the sensor system 44 with different number of sensors, switches or signal generators may be envisaged.

Figure 3:
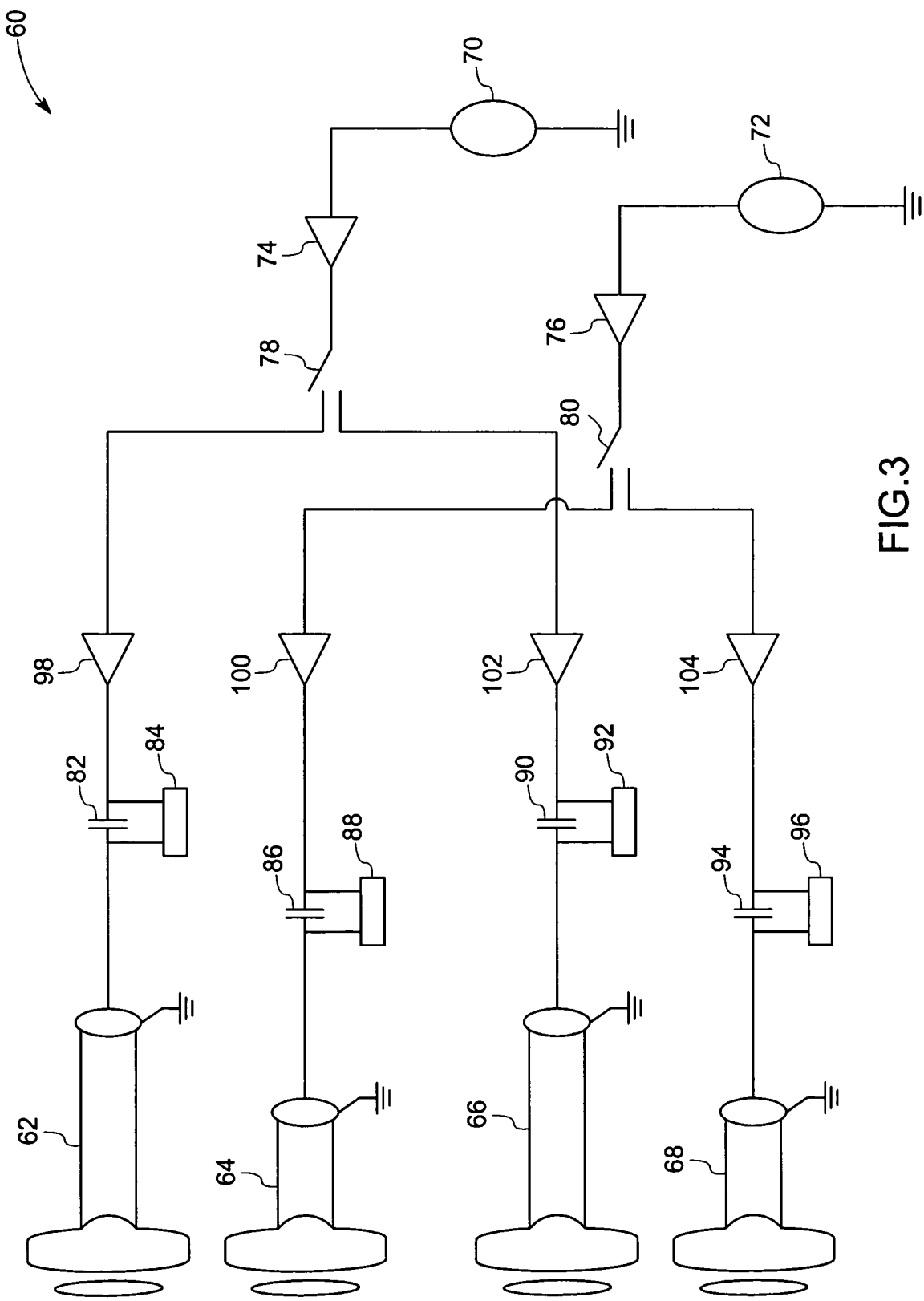
FIG. 3 is a diagrammatical representation of a sensor system, in accordance with yet another exemplary embodiment of the present technique.

FIG. 3 illustrates an exemplary sensor system 60 for measuring clearance between two objects that employs a combination of multiple excitation and switched excitation techniques as described above with reference to FIG. 1 and FIG. 2. The sensor system 60 includes four sensors that are represented by reference numerals 62, 64, 66 and 68. Further, signal generators 70 and 72 are coupled to the sensors 62, 64, 66 and 68 to provide input excitation signals to the sensors 62, 64, 66 and 68. In addition, the input excitation signals from the signal generators 70 and 72 may be amplified through amplifiers 74 and 76, respectively. The excitation signals from the signal generators 70 and 72 may be switched between the sensors 62, 64, 66 and 68 through switches 78 and 80. In operation, when switch 78 and switch 80 are in a first position the excitation signals are provided to the sensors 62 and 66. In this embodiment, the sensors 62 and 66 are excited at different frequencies through the signal generators 70 and 72. Alternatively, when the switch 78 and the switch 80 are in a second position the excitation signals are provided to the sensors 64 and 68. Again, the sensors 64 and 68 are excited at different frequencies through the signal generators 70 and 72.

A capacitor 82 and a measurement device 84 are coupled to the sensor 62 for measuring the capacitance between the two objects. Similarly, a capacitor 86 and a measurement device 88 are coupled to the sensor 64. In addition, capacitors and measurement devices are coupled to the sensors 66 and 68 as represented by the reference numerals 90, 92, 94 and 96. In one embodiment, amplifiers 98, 100, 102, and 104 may be coupled to the sensors 62, 64, 66 and 68 respectively for amplifying the signals from the signal generators 70 and 72. The measurement signals from the sensors 62, 64, 66 and 68 are processed to determine the clearance between the two objects. In this embodiment, the combined excitation technique enables the measurement of the capacitance via four sensors 62, 64, 66 and 68 by using only two frequencies applied at two different points in time. The technique is particularly advantageous for measurements of capacitance in applications that require a large number of sensors to cover a large area on a component.

Figure 4:
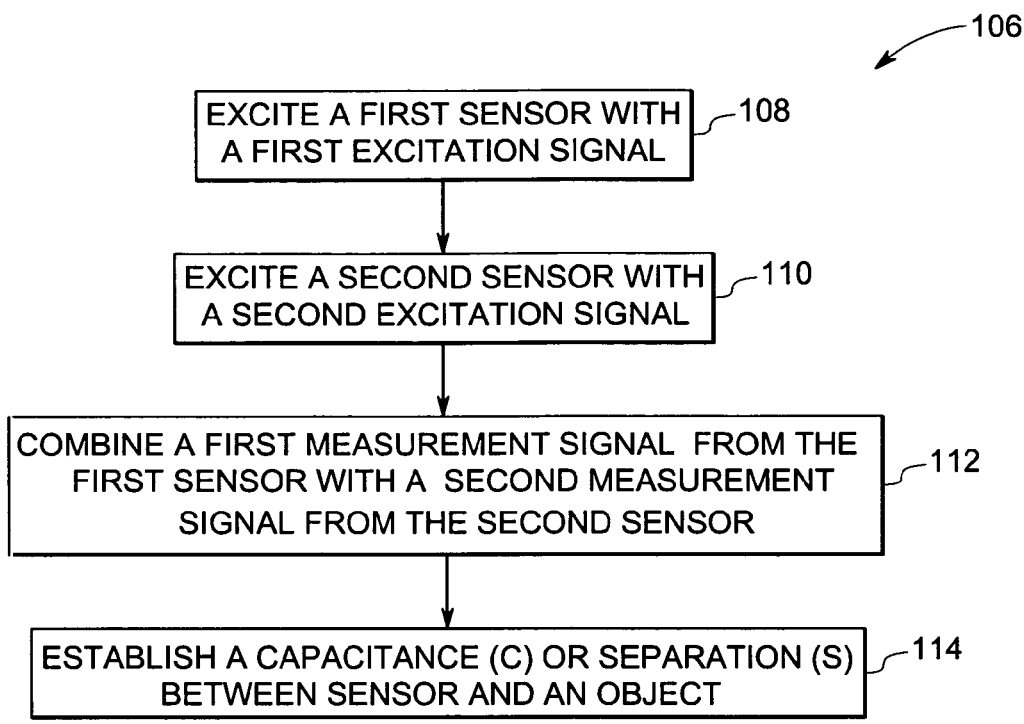
FIG. 4 is a flow chart illustrating a method of operating the sensor system of FIG. 1.

Referring generally to FIG. 4, an exemplary method 106 of operating the sensor system 10 of FIG. 1 is illustrated. Initially, a first sensor is excited with a first excitation signal at a first excitation frequency, as represented by step 108. The first excitation signal may be an alternating current (AC) based signal. The first sensor provides a first measurement signal representative of a capacitance between two objects. Next, at step 110 a second sensor is excited with a second excitation signal to provide a second signal representative of the capacitance between two objects. The second sensor is excited at an excitation frequency that is different than the first excitation frequency and is harmonically unrelated to the first excitation frequency. The first and second measurement signals may be detected via a synchronous measurement scheme to eliminate any effects of crosstalk between the first and second sensors. At step 112 the first measurement signal from the first sensor is combined with the second measurement signal from the second sensor. Subsequently, the separation (S) between the sensor and the external object is established based upon the capacitance (C) sensed by the sensor, as represented by step 114.

Figure 5:
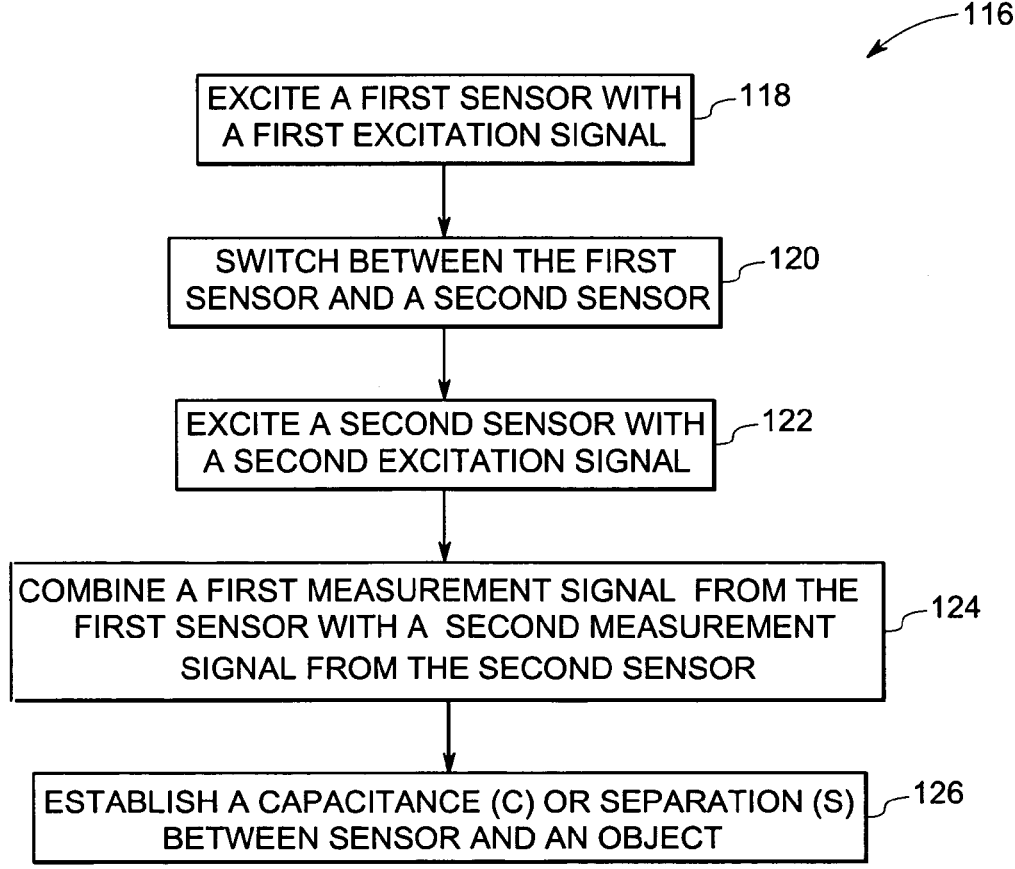
FIG. 5 is a flow chart illustrating a method of operating the sensor system of FIG. 2.

FIG. 5 illustrates an exemplary method 116 of operating the sensor system 44 of FIG. 2. In the illustrated method, separation (S) and/or capacitance (C) are established by employing a switched excitation technique. Initially, a first sensor is excited with a first excitation signal to provide a first measurement signal, as represented by step 118. Next, at step 120 the excitation is switched from the first sensor to the second sensor. At step 122, a second sensor is excited at a second excitation signal to provide a second measurement signal. Further, at step 124 the first measurement signal is combined with the second measurement signal, each signal being representative of the sensed capacitance between the sensor and an external object. At step 126 the separation (S) between the sensor and the external object is established based upon the capacitance (C) sensed by the sensor.

The various aspects of the method described hereinabove have utility in different applications. For example, the technique illustrated above may be used for measuring the clearance between rotating and static components in an aircraft engine. The technique may also be used in certain other applications for example for measuring clearance between objects in gas turbines, steam turbines and so forth.

As noted above, even more generally, the method described here may be advantageous for providing accurate measurement of clearance between objects through sensors by reducing the crosstalk between multiple sensors. Further, the technique is particularly advantageous to provide a self-calibrating sensor system for accurate clearance measurement of parts, even in operation and over extended periods of time, enabling better clearance control in parts while in operation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of operating a sensor system comprising:
   exciting a first sensor with a first excitation signal at a first frequency;
   exciting a second sensor with a second excitation signal at a second frequency different from the first frequency;
   detecting a first signal from the first sensor using the synchronous measurement scheme based on the first frequency;
   detecting a second signal from the second sensor using the synchronous measurement scheme based on the second frequency;
   generating first and second measurement signals from the first and second sensors via a synchronous measurement scheme comprising performing a plurality of phase measurements to determine a phase between reflected signals and respective excitation signals, wherein the first and second signals comprise the reflected signals; and
   combining the first measurement signal generated from the first sensor with the second measurement signal generated from the second sensor to determine a sensed parameter.

2. The method of claim 1, wherein the first and second sensors are capacitive probes, and wherein the sensed parameter is a capacitance.

3. The method of claim 1, wherein the first and second sensors are disposed in a close proximity to one another.

4. The method of claim 1, wherein the first and second frequencies are harmonically unrelated.

5. The method of claim 1, wherein the first and second sensors are excited simultaneously.

6. The method of claim 1, further comprising exciting at least one additional sensor with an excitation signal at a respective frequency that is different from the first and second frequencies, wherein the combining comprises combining each of the respective measurement signals to determine the sensed parameter.

7. The method of claim 1, wherein the phase measurements comprise filtering each of the phases to obtain the first and second measurement signals.

8. The method of claim 7, wherein filtering comprises averaging the phases.

9. A method of measuring a clearance between a first object and a second object, said method comprising:
   exacting a first capacitive sensor with a first excitation signal at a first frequency to generate a first measurement signal;
   exciting a second capacitive sensor with a second excitation signal at a second frequency different from the first frequency to generate a second measurement signal;
   detecting corresponding first and second reflected signals from the first and second sensors;
   performing a plurality of phase measurements via a synchronous measurement scheme to determine a phase between reflected signals and respective excitation signals; and
   combining the first measurement signal with the second measurement signal to determine a capacitance, wherein the capacitance is representative of the clearance between the first and second objects.

10. The method of claim 9, wherein the first and second frequencies are harmonically unrelated.

11. The method of claim 9, wherein the phase measurements comprise filtering each of the phases to obtain the first and second measurement signals.

12. A method of operating a sensor system comprising:
    exciting a first sensor with a first excitation signal;
    switching between the first sensor and a second sensor;
    exciting the second sensor with a second excitation signal;
    detecting a first signal from the first sensor using a synchronous measurement scheme to generate a first measurement signal;
    detecting a second signal from the second sensor using the synchronous measurement scheme to generate a second measurement signal, wherein first and second signals comprise reflected signals and the synchronous measurement scheme comprises performing a plurality of phase measurements to determine a phase between each of the reflected signals and the respective excitation signals; and
    combining the first measurement signal from the first sensor with the second measurement signal from the second sensor to determine a sensed parameter.

13. The method of claim 12, wherein the phase measurements comprise filtering each of the phases to obtain the first and second measurement signals.

14. The method of claim 12, further comprising:
    holding the first sensor at a pre-determined voltage while exciting the second sensor; and
    holding the second sensor at a fixed voltage while exciting the first sensor.

15. A sensor system comprising;
    at least two sensors configured to receive respective excitation signals, each of the excitation signal having a respective frequency;
    at least one switch coupled to the sensors and configured to switch the excitation signals between the sensors at a pre-determined switching interval; and
    a combiner configured to combine a plurality of measurement signals from the sensors to determine a sensed parameter;
    wherein the combiner is configured to receive the plurality of measurement signals from the sensors via a synchronous measurement scheme for performing a plurality of phase measurements to determine a phase between reflected signals and respective excitation signals.

16. The sensor system of claim 15, wherein the sensors are capacitive probes, and wherein the sensed parameter is capacitance.

17. The sensor system of claim 15, further comprising at least one signal generator configured to supply the excitation signals to the sensors.

18. A sensor system comprising:
- a first set of sensors comprising at least two sensors configured to receive a respective excitation signal, each of the excitation signals having a respective frequency;
- a second set of sensors comprising at least two sensors configured to receive a respective excitation signal, each of the excitation signals having a respective frequency;
- at least one switch configured to switch the excitation signals from the first set of sensors to the second set of sensors; and
- a combiner configured to combine a plurality of measurement signals from the first and second sets of sensors to determine a sensed parameter;
- wherein the combiner is configured to receive the plurality of measurement signals from the first and second sets of sensors via a synchronous measurement scheme for performing a plurality of phase measurements to determine a phase between reflected signals and respective excitation signals.

* * * * *